(12) United States Patent
Saado

(10) Patent No.: US 7,613,186 B2
(45) Date of Patent: Nov. 3, 2009

(54) PROCESSING MULTIPLEX SUBLAYER DATA UNIT DATA IN HARDWARE

(75) Inventor: Alon Saado, San Diego, CA (US)

(73) Assignee: Via Telecom Co., Ltd., San Diego, CA (US)

( * ) Notice: Subject to any disclaimer, the term of this patent is extended or adjusted under 35 U.S.C. 154(b) by 850 days.

(21) Appl. No.: 10/840,492

(22) Filed: May 6, 2004

(65) Prior Publication Data

US 2005/0249204 A1 Nov. 10, 2005

(51) Int. Cl.
H04L 12/28 (2006.01)
(52) U.S. Cl. .................... 370/392; 370/412
(58) Field of Classification Search ............. 370/389, 370/392, 412, 413, 415, 417, 419
See application file for complete search history.

(56) References Cited

U.S. PATENT DOCUMENTS

| | | | | |
|---|---|---|---|---|
| 5,757,416 A | * | 5/1998 | Birch et al. | 725/144 |
| 5,946,313 A | * | 8/1999 | Allan et al. | 370/397 |
| 6,483,838 B1 | * | 11/2002 | Ostman et al. | 370/395.31 |
| 6,504,845 B1 | | 1/2003 | Petersen et al. | 370/412 |
| 6,597,698 B1 | | 7/2003 | Lundback et al. | 370/398 |
| 6,708,233 B1 | | 3/2004 | Fuller et al. | 710/22 |
| 6,738,381 B1 | | 5/2004 | Agnevik et al. | 370/395.7 |
| 6,804,246 B1 | | 10/2004 | Petersen et al. | 370/395.64 |
| 6,850,508 B1 | * | 2/2005 | Chang et al. | 370/335 |
| 2002/0022944 A1 | * | 2/2002 | Gernhardt | 702/183 |
| 2004/0062267 A1 | * | 4/2004 | Minami et al. | 370/463 |
| 2004/0170182 A1 | * | 9/2004 | Higashida et al. | 370/401 |

FOREIGN PATENT DOCUMENTS

WO    WO 03/017577 A1    2/2003

* cited by examiner

*Primary Examiner*—Kevin C Harper
*Assistant Examiner*—Sai-Ming Chan
(74) *Attorney, Agent, or Firm*—Christopher P. Maiorana, PC

(57) ABSTRACT

The present invention concerns an apparatus comprising a data unit, a memory and a control unit. The data unit may be configured to generate an output signal comprising a series of frames each having a header and a payload in response to an input signal comprising a series of words. The memory may be configured to hold the output signal and to interface with a device. The control unit may be configured to present one or more control signals configured to control the data unit and the memory.

21 Claims, 7 Drawing Sheets

PROCESSING MULTIPLEX SUBLAYER DATA UNIT DATA IN HARDWARE

FIELD OF THE INVENTION

The present invention relates to data transfer generally and, more particularly, to a method and/or architecture for processing multiplex sublayer data unit data in hardware.

BACKGROUND OF THE INVENTION

In conventional data transfer systems, a multiplex sublayer has both a transmitting and a receiving function. The transmitting function combines information from various sources (e.g., upper layer signaling, voice service, data service instances, etc.) to form service data units (SDUs). The receiving function separates the information contained in the SDUs and directs the information to the correct entity (e.g., upper layer signaling, voice service, data service instances, etc.). Information bits are exchanged between a connected service or a logical channel and the multiplex sublayer in a unit called a data block. The multiplex sublayer multiplexes one or more data blocks into a multiplex sublayer data unit (MUXPDU), and combines one or more MUXPDUs into SDUs.

There are several types of conventional MUXPDUS. Each conventional MUXPDU normally has a unique structure and is used for a specific purpose. In general, each MUXPDU contains a header and a data block, where the header has a number of fields. Using software to process the data uses significant MIPS (millions of instructions per second). Additionally, software implementations can create serious processing problems, especially when the data rate is high. Such computing overhead is especially relevant for Reduced Instruction Set Computing (RISC) processors.

It would be desirable to implement a system for processing MUXPDU data in hardware.

SUMMARY OF THE INVENTION

The present invention concerns an apparatus comprising a data unit, a memory and a control unit. The data unit may be configured to generate an output signal comprising a series of frames each having a header and a payload in response to an input signal comprising a series of words. The memory may be configured to (a) hold the output signal and (b) interface with a device. The control unit may be configured to present one or more control signals configured to control the data unit and the memory.

The objects, features and advantages of the present invention include providing a data transfer system that may (i) process MUXPDU data, (ii) be implemented in hardware, (iii) reduce the processing load from a processor, (iv) implement each-field of an MUXPDU header to be stored at a different address that may be easily read and analyzed, (v) implement a data block separately from a header such that the data block may be copied without using shift commands, (vi) implement a different word size for processed data (e.g., 32-bit words) to increase the efficiency and the speed of handling data frames, (vii) implement a MUXPDU processor that may process and store more than one frame, (viii) implement two banks that may be used to provide more time for the processor to read data and relax the response time, (ix) handle different types of MUXPDU data, (x) store the data in the same structure, and/or (xi) simplify the software.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may implement a frame that may contain one or more multiplex sublayer data units (MUXPDUs). Each MUXPDU contains a header and a data block.

Figure 1:
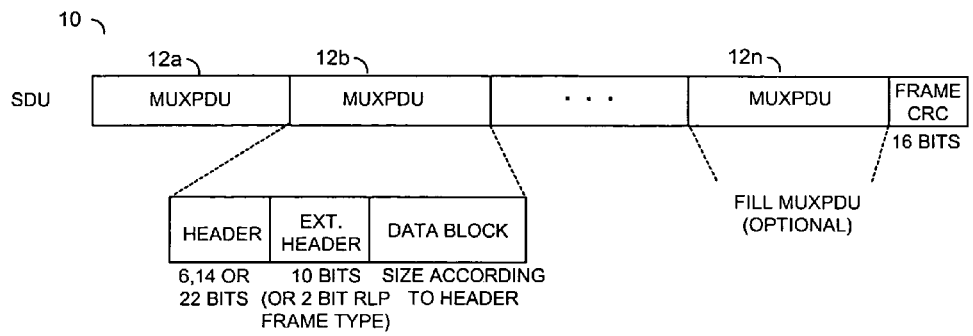
FIG. 1 is a diagram illustrating a conventional MUXPDU type 5 frame.

FIG. 1 illustrates a typical Type 5 MUXPDU frame 10. The frame 10 is shown having a number of MUXPDUs 12a-12n. The last MUXPDU 12n may be a fill MUXPDU. The MUXPDU 12n contains a data block filled with '0' bits in order to fill the last unused bits of the frame 10. The frame 10 may contain a number of words. In one example, the frame 10 may be 3840 bits, and the word size may be 16-bits. However, other sizes may be implemented to meet the design criteria of a particular implementation.

The present invention processes MUXPDU data in hardware and stores the header and the data (or payload) in different addresses. When possible, only the header information is stored. Avoiding processing of data significantly reduces the MIPS and the load from a processor. The MUXPDU processor of the present invention may be flexible and may be implemented to process more than one frame.

Figure 2:
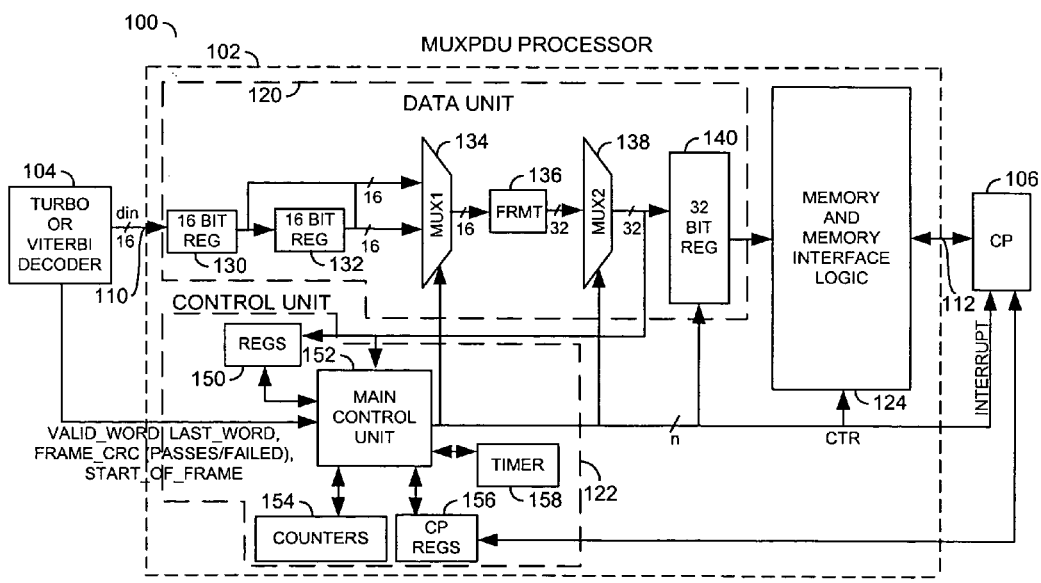
FIG. 2 is a block diagram of a preferred embodiment of the present invention.

Referring to FIG. 2, a circuit 100 is shown in accordance with a preferred embodiment of the present invention. The circuit 100 generally comprises a processor portion (or circuit) 102, an input portion (or circuit) 104 and an output portion (or circuit) 106. The input portion 104 may be implemented as a Turbo (or Viterbi) decoder. The output portion 106 may be implemented as a co-processor. The processor portion 102 may have an input 110 that may receive a data signal (e.g., DIN) from the input section 104. The signal DIN generally comprises a series of words. The processor section 102 has an input/output 112 that interfaces with the output section 106.

Figure 5:
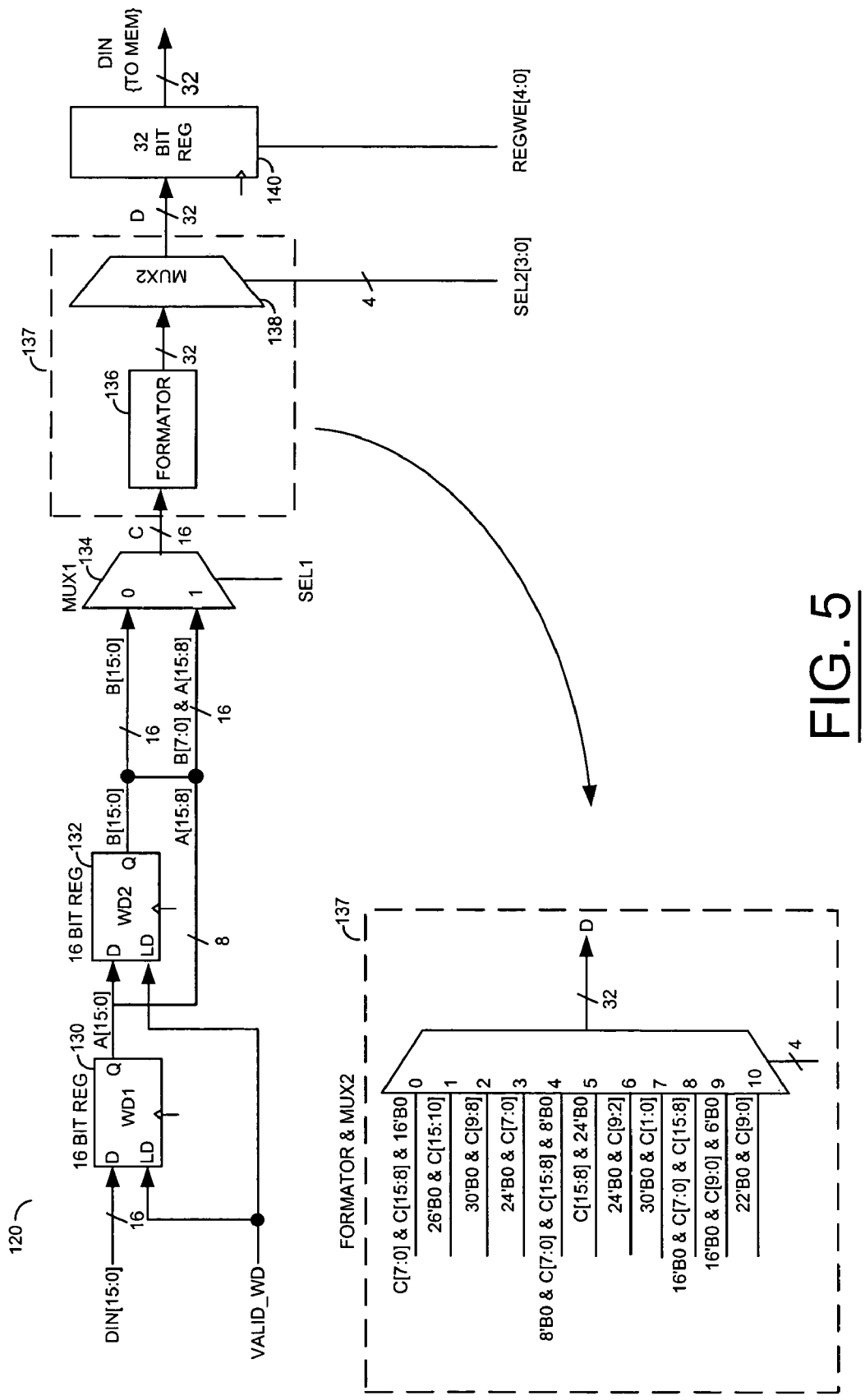
FIG. 5 is a block diagram of the data unit.

The processor section 102 generally comprises a data unit 120, control unit 122, and a memory 124. The data unit 120 generally comprises a register 130, a register 132, a multiplexer 134 (MUX1), a block (or circuit) 136, a multiplexer 138 (MUX2), and a register 140. The register 130 and the register 132 may be implemented as 16-bit registers. However, other bit-widths may be implemented to meet the design criteria of a particular implementation. The register 130 generally receives the input signal DIN. An output of the register 130 comprises 16-bits of the signal DIN and is generally connected to an input of the register 132 and a first input of the multiplexer 134. The multiplexer 134 normally receives the 8 most significant bits of the register 130. The block 136 may be implemented as a formater (or conversion circuit). The formater 136 may be used to convert from at 16-bit word to a 32-bit word. The register 132 has an output that is generally connected to a second input of the multiplexer 134 and generally represents 16-bits of the signal DIN. The register 130 and the register 132 present particular bits of the signal DIN to the multiplexer 134, which selects which bits (e.g., either the bits from the register 132, alternating bits from each of the registers 130 and 132, etc.) to present to the formater 136. The multiplexer 134 may receive one or more bits of a control signal (e.g. CTR) that is generally received from the control unit 122. The control signal CTR may be presented over a bus connecting the various components shown in FIG. 2. The multiplexer 134 is generally connected to the multiplexer 138 through the conversion circuit 136. A more detailed diagram of the multiplexer 138 is shown in FIG. 5. The multiplexer 138 also receives the control signal CTR from the control unit 122. The multiplexer 138 has an output connected to the register 140. The register 140 also receives one or more bits of the control signal CTR.

The control unit 122 generally comprises a register block (or circuit) 150, a main control unit 152, a counter block 154, a register block (or circuit) 156 and a timer block (or circuit) 158. The main control unit 152 generally presents the control signal CTR in response to signals from the input section 104, the data unit 120, the register 150, the counters 154, the registers 156, and the timer 158. The control signal CTR may be implemented to include one or more control bits and/or one or more interrupts.

The circuit 102 may be implemented as a multiplex sublayer data unit (MUXPDU) processor configured to (i) process MUXPDU data and (ii) store the processed data in the memory 124. In one implementation, the words received from the decoder may be 16-bit words. The memory 124 may store data in 32-bit words. With such an example, the registers 130 and 132 may be implemented to store 16-bit words. However, the particular bit width of the words may be varied to meet the design criteria of a particular implementation.

The circuit 104 (e.g., a Viterbi Decoder, a Turbo Decoder, or other type of decoder) normally supplies the data words. The circuit 106 normally reads the processed MUXPDU data after receiving an interrupt (e.g., one of the bits of the control signal CTR). With such an implementation, one or two frames are generally processed between interrupts. In one example, additional frames (e.g., N frames), may be processed between interrupts.

The circuit 124 generally comprises a memory and memory interface logic configured to store the processed MUXPDU data. Two banks of memories (to be described in more detail in connection with FIG. 6) may be used to allow more time for the coprocessor 106 to read the processed data. For example, when one bank of memory is written to, the other bank may be read from.

The registers 130 and 132 may be used to store two consecutive words received from the decoder 104. The multiplexers 134 and 138, and the formater 136, may be used to shift the data words so that certain bits may be extracted and stored in the register 140. Since the decoder 104 may supply 16-bit words, up to three words may be needed to assemble one 32-bit word. For example, 8-bits may be used from the first word, 16-bits from the second word and 8-bits from the third word. For example, an 8-bit header may be followed by data broken down as described. When a 32-bit word is ready in the register 140, the word is stored into the memory 124.

The register block 156 may include a number of control registers. The control registers of the register block 156 may be used to configure the main control unit 152. Parameters that may be configured include the MUXPDU type, the frame size, the number of MUXPDU data blocks in the frame, etc. One or more of the registers of the register block 150 may be used to store temporary information, such as the MUXPDU header, that may be needed for the duration of a MUXPDU processing. Such temporary information may only be contained in the first word of a MUXPDU data block. The counter block 154 may include one or more counters. The counters of the counter block may be used to count the number of bits received, the number of MUXPDUs processed, the number of MUXPDU stored in the memory, etc.

The control unit 122 may process two frames, and then notify the coprocessor 106 that the data is ready, normally by generating an interrupt (e.g., one of the bits of the signal CTR). The timer 158 may be programmed for the time the control unit 122 should wait for the second frame. If the timer 158 reaches zero, the control unit 122 presents the signal INTERRUPT to the coprocessor 106 indicating that the coprocessor 106 should read the processed data of only one frame from the memory 124. The main control unit 152 includes two finite state machines (to be described in detail in connection with FIGS. 7 and 8) to supply the various bits of the control signal CTR to the data unit 120 (and to the components within the control unit 122).

The MUXPDU data contains a header, which may have a number of fields, and a data block. The MUXPDU processor 100 normally stores the header fields in separate addresses followed by the data block. The processor 100 may use the first few addresses to store information words. The information words may include global information words containing parameters and data that may be useful to the coprocessor 106. In such an implementation, two addresses are normally assigned, one for each frame. However, additional addresses may be assigned to store more information if processing of more than two frames is supported and/or more data is needed by the coprocessor 106.

Figure 3:
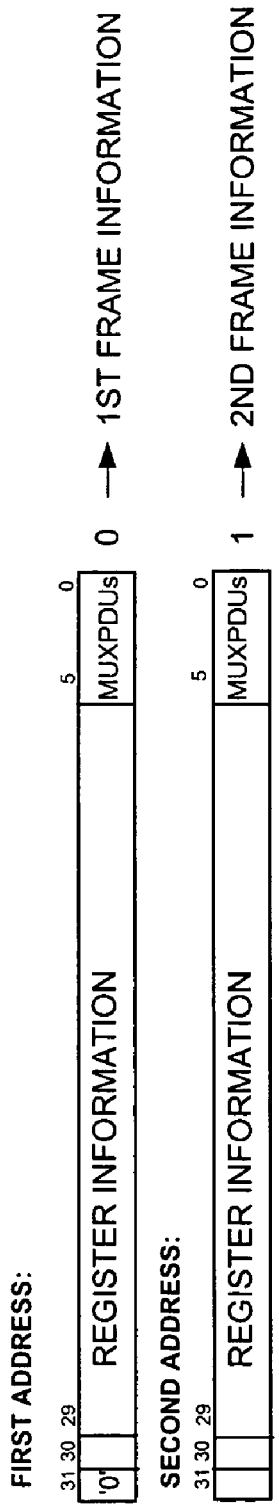
FIG. 3 is a diagram illustrating the memory content that may be used for storing MUXPDU data.
Figure 3:
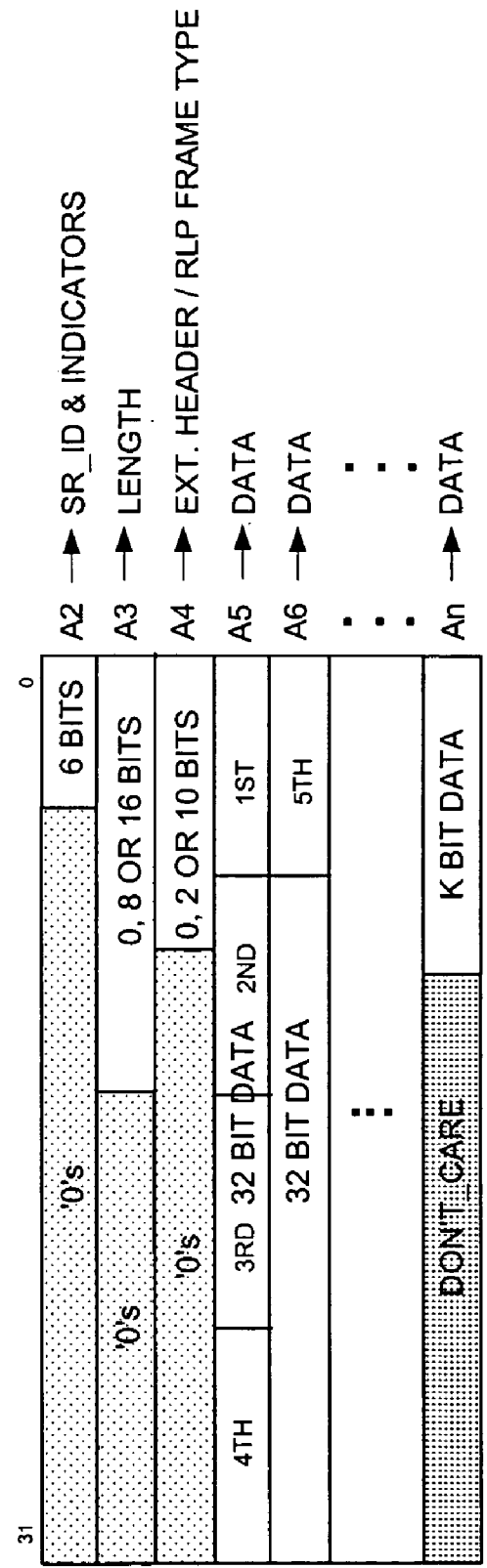

Referring to FIG. 3, a diagram illustrating the content of the memory 124 is shown. The arrangement shown may be used for storing the MUXPDU data of one or two frames. In one example, the data may be stored in the memory 124 in the following order (but other formats may be used). A first address may contain information about the first frame. The first address may include (i) the number of MUXPDUs stored in the memory 124 for the first frame, (ii) frame CRC information and (iii) other information such as one or more bits of the control registers 150 and/or 156. The first address is shown having 32 data bits (e.g.,[31:0]). The data bits D [5:0] may indicate the number of MUXPDUs saved in the memory 124 for the first frame. In the example shown, six bits were assigned for the first frame. However, the number of bits may be varied to meet the design criteria of a particular implementation. The data bits D[29:6] may be used to store other information, such as certain bits of the control registers 150 and/or 156 that may be used for controlling the coprocessor 106. The data bit D[30] may store CRC information for the first frame (e.g., 0=Frame CRC failed, 1=Frame CRC passed) for statistical or other purposes. The data bit D[31] may be a reserved bit that is not used in the first address (e.g., a '0').

A second address may store information about the second frame. The second address is normally used if two frames are processed between interrupts. The second address is shown having 32 data bits (e.g., [31:0]). The second address may (i) include the number of MUXPDUs stored in the memory for both frames, (ii) CRC information of the second frame, (iii)

the number of frames that were processed, and (iv) other information such as one or more bits from the control register block 150 and/or 156.

The data bits D[5:0] may indicate the number of MUXPDUs saved in the memory 124 for both frames. In the example shown, six bits were assigned for indicating the first and second frames. However, the particular number of bits may be varied to meet the design criteria of a particular implementation. The data bits D[29:6] may be used to store information, such as certain bits of the control register block 150 and/or 156, that may be used for controlling the coprocessor 106. The data bit D[30] may store CRC information for the second frame (e.g., 0=Frame CRC failed, 1=Frame CRC passed). The data bit D[31] may indicate the number of frames that are stored in the memory 124 (e.g., 0=one frame, 1=two frames).

The additional addresses shown contain the MUXPDU data. In the example discussed, the decoder 104 generally supplies a series of words (e.g., 16-bit words). The data unit 120 stores two words in each address (i.e., 4 bytes). In each MUXPDU block, the first address contains the header. Normally, six bits are used for the header and any unused bits are filled with zeros. The second address contains the length of the data. The number of bits used to store the length varies according to the MUXPDU type. In a typical implementation, 8 bits or 16 bits are used. The second address may not need to be used if the MUXPDU does not have a length field. In that case, the data is "don't_care" (e.g., the coprocessor 106 does not read that address).

The third address may contain a 10-bit extension header or 2-bit radio link protocol (RLP) frame type. The 2-bit RLP data may implement a delivery protocol used by other devices (e.g., a system-on-chip). The unused bits are filled with zeros. The third address may not need to be used if the MUXPDU data does not have an extension header field. In that case, the data is 'don't care' (e.g., the coprocessor 106 does not read that address). The next addresses may contain a 32-bit data word. The last address may contain less than 32-bits. The rest of the word is treated as a 'don't care' configuration.

Figure 4:
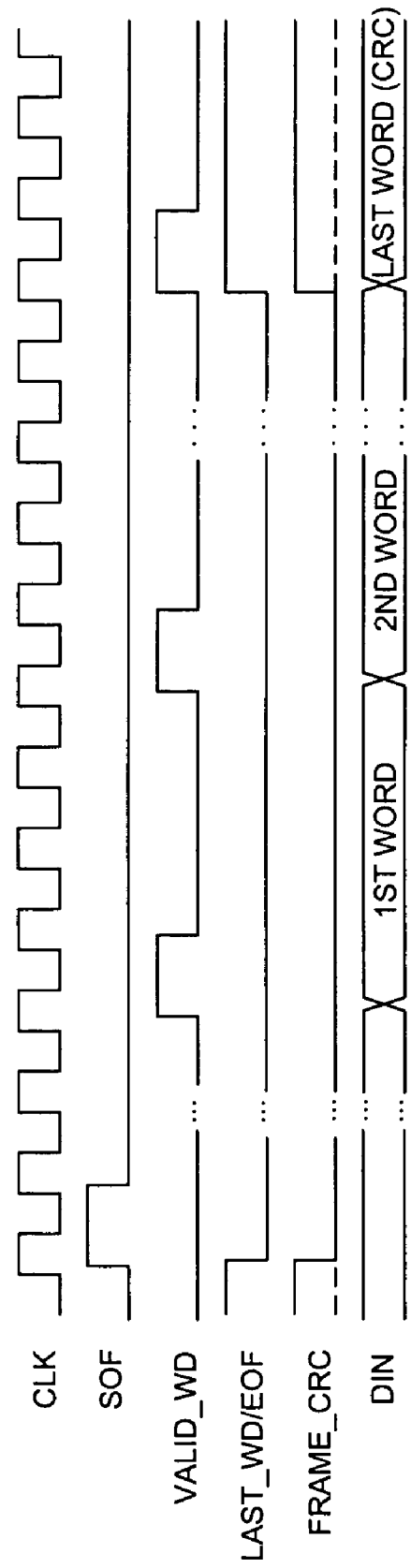
FIG. 4 is a timing diagram illustrating various signals received from the decoder.

Referring to FIG. 4, a timing diagram illustrating the signals received from the decoder 104 is shown. The signal DIN represents the data divided into a series of words. The signal VALID_WD may be a pulse configured to indicate when a new data word is ready. The number of clock cycles between pulses of the signal VALID_WD may be different in each application. A start of frame signal (e.g., SOF) may be a pulse configured to indicate the start of a frame. An end of frame signal EOF (or LAST_WD) may be configured to indicate the last valid word or end of frame. The signal FRAME_CRC may be configured to indicate the frame CRC received from the decoder.

Referring to FIG. 5, a detailed diagram of the data unit 120 is shown with examples of the sizes of the various components. The data unit 120 is shown containing two 16-bit registers 130 and 132, a formater 136, one 32-bit register 140 and the multiplexers 134 and 138. The two 16-bit registers 130 and 132 save the last two consecutive words received from the decoder 104. In the implementation illustrated, the header starts from the most significant bit (MSB) of the word (i.e., bit 15). Minor modifications may be needed if the header starts from the least significant bit (LSB). The header is byte aligned and normally starts from bit 15 or bit 8.

The multiplexer MUX1 presents a 16-bit word to the formater 136. In the beginning of each MUXPDU, the signal SELL (one of the control signals CTR) is asserted or deasserted. The signal SELL remains at the same polarity during the processing of a particular MUXPDU. If the header of a MUXPDU starts from bit 8, the signal SEL1 is asserted and the first bit of the MUXPDU header is located at bit 15. The signal SEL1 is supplied by the control unit 122 according to the frame size and the MUXPDU sizes. The control unit 122 uses the counter block 154 to detect if a header starts from bit 15 or bit 8. The counter block 154 may also be used to set the signal SEL1 accordingly.

The multiplexer MUX2 and the formater 136 (e.g., a conversion circuit 137) may extract one or more bits of the word. The conversion circuit 137 may shift the data to a desirable location within a 32-bit word prior to the writing to the register 140. The unused bits are filled with zeros. The control signal SEL2 (e.g., a 4-bit signal) is generally supplied by the control unit 122 according to the field that being processed. In the example with a 16-bit words, eleven combinations may be used in order to achieve the structure described in FIG. 3 as shown in the following TABLE 1:

TABLE 1

| Mux Input | Use |
| --- | --- |
| 0 | Shift data (2 bytes) to the most significant locations ($3^{rd}$ and $4^{th}$) |
| 1 | Shift header to bit 5:0 |
| 2 | Shift RLP Frame Type to bit 1:0 |
| 3 | Shift data (1 byte) to the least significant byte |
| 4 | Shift data (2 bytes) to the $2^{nd}$ and $3^{rd}$ locations |
| 5 | Shift data (1 byte to the most significant byte ($4^{th}$ byte) |
| 6 | Shift 8 bit length field to the first byte |
| 7 | Shift RLP Frame Type to bit 1:0 when following a length field |
| 8 | Shift data (2 bytes) to the $1^{st}$ and $2^{nd}$ locations |
| 9 | Shift the 10 most significant bits of a 16 bit length field |
| 10 | Shift the extension Header |

However, the particular number of combinations, and the particular order of the bits in each combination may be varied to meet the design criteria of a particular implementation. TABLE 1 shows an example for processing MUXPDU type 3 and 5 frames. Various modifications may be made to process other MUXPDU types.

The register 140 may be divided to a number parts, each with a separate bit of an enable signal (e.g., REGWE[4:0]). The signal REGWE[4:0] may be supplied by the control unit 122 and may be used to assemble the 32-bit words. Since the decoder 104 may present 16-bit words, bits from up to three different 16-bit words are stored in the register 140 in order to assemble one 32-bit word. When a 32-bit word is ready in the register 140, the word is written into the memory 124.

Figure 6:
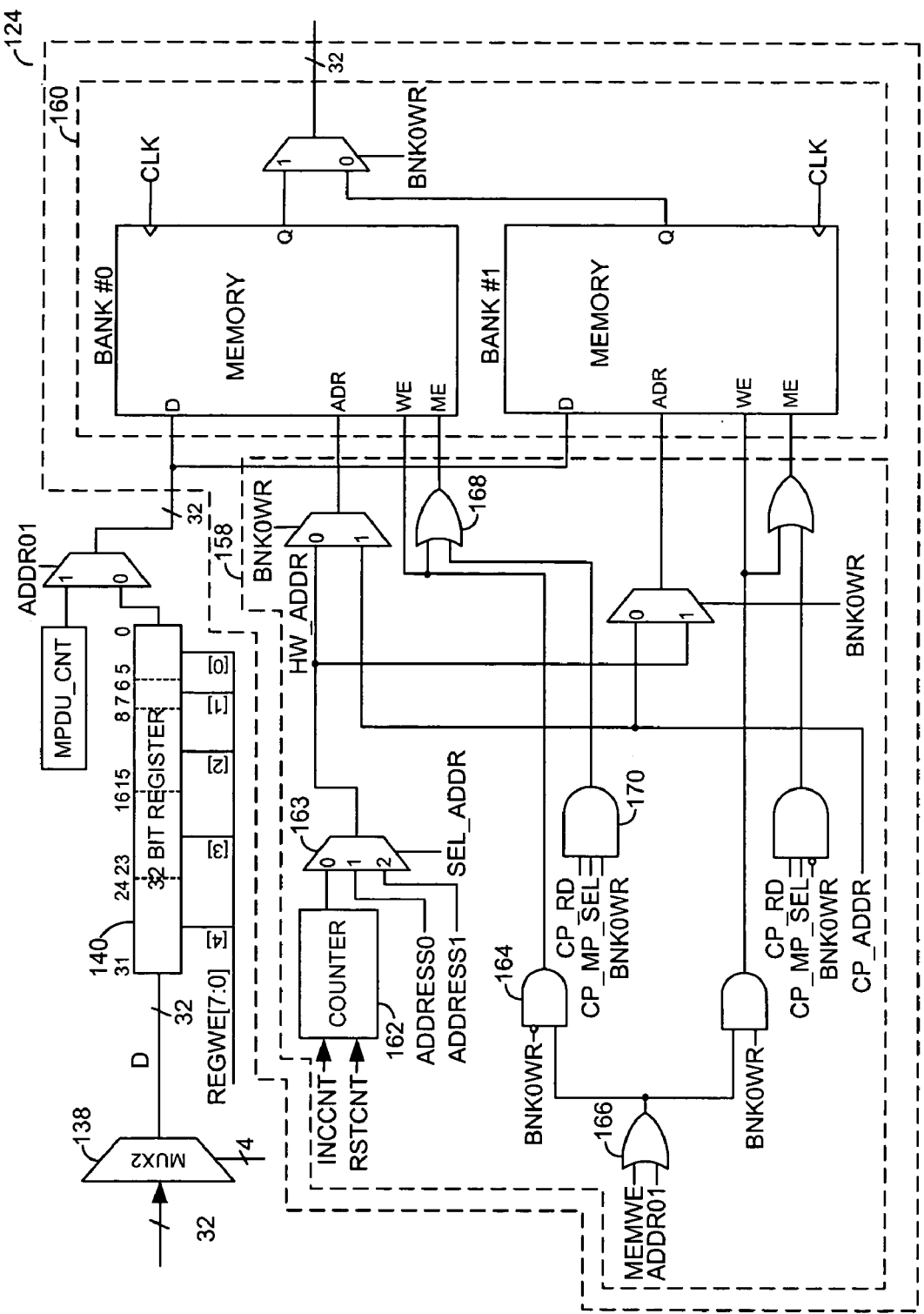
FIG. 6 is a diagram illustrating the memory interface.

Referring to FIG. 6, a more detailed diagram of the memory and memory interface logic block 124 is shown. The block 124 generally includes a logic portion 158 and a memory 160. The memory 160 may be implemented as two memory banks (e.g., BANK#0 and BANK#1). The logic 158 may be used to control reads and writes to and from the memory banks BANK#0 and BANK#1. The memory banks BANK#0 and BANK#1 may be implemented as synchronous one-port memories. However the particular memory type and the particular number of banks may be varied to meet the design criteria of a particular implementation. Using a two bank implementation of the memory 160 may allow more time for the coprocessor 106 to read the processed data. When one bank is written to, the other bank can be read from. A signal BNK0WR selects which of the memory banks BANK#0 and BANK#1 is read from and which is written to.

The signal INCCNT may increment the counter 162 to point to the next address. The signal RSTCNT may reset the counter 162 to the initial value (e.g., address 2 because address 0 and 1 are information words, the data is stored starting from address 2). The signal ADDRESS0 represents the first address of the memory 160. The signal ADDRESS1 represents the second address of the memory 160. The idea is to point to ADDRESS0 or ADDRESS1 after processing a frame so an information word can be written. The signal SEL_ADDR selects the signal ADDRESS0, the signal ADDRESS1 or the output of the counter 162 to point to the next address that the data is going to be written to. The signal CP_RD may be implemented as a coprocessor read enable signal. The signal CP_MP_SEL may be implemented as a coprocessor module select (e.g., the coprocessor can read from several modules, where each module has an enable). When the signal CP_RD and the signal CP_MP_SEL are active, the coprocessor 106 reads from the memory 160. The signals CP_MP_SEL and CP_RD generally enable one of the banks of the memory 160. The signal HW_ADDR may be the output of a multiplexer 163 that is configured to select between the signal ADDRESS0, the signal ADDRESS1 and the output of the counter 162. The signal ADDR01 may be an enable for the memory 160 for a write operation. The memory 160 is generally activated either by activation of the signal MEMWE or the signal ADDR01. The signal ADDR01 is active when a write occurs at the ADDRESS0 or ADDRESS1. In certain applications, the signal ADDR01 may not be needed.

The 32-bit register 140 is used to assemble the data prior to being written to the memory 160. The register 140 generally has 5 fields in order to be able to store only part of the bits in a certain location without corrupting the other bits. When a 32-bit word is ready in the register 140, the word is then written to the memory 160. The address is generated by a counter 162. The address may be forced to be address zero (e.g., ADDRESS0) or address one (e.g., ADDRESS1) when a frame (or word) is written. In that case, the stored data is the content of the MUXPDU counter (e.g., part of the counters block 154), part or all of the registers 150 and/or 156 and the frame CRC information.

One or more other gates (e.g., 164, 166, 168 and 170) generate a write enable WE and a memory enable ME signals. When one bank is filled, the MUXPDU module generates an interrupt to be presented the coprocessor 106. The coprocessor 106 may read the data from the selected bank. The non-selected bank may be filled with new data.

The control unit 122 generally supplies control signals to the data unit 120, to the memory block 124 and to the coprocessor 106. The control unit 122 may contain one or more finite state machines (FSM), the counter block 154, the register block 156, the register block 150, and a timer block 158. The main control unit 152 may contain a first state machine that controls the number of frames to be processed (to be described in more detail in connection with FIG. 7). Normally, if the frames are short (e.g., 5 millisecond frames), more than one frame is processed in order to reduce the number of interrupts presented to the coprocessor 106. When the frames are long (e.g., 20 millisecond frames), the control unit 122 may be configured to processes one frame, and then present an interrupt. In such an implementation, the processor 106 may be configured to process one or two frames. While one or two frames have been described, the present invention may be modified to support the processing of N frames.

When the start of frame signal SOF from the decoder 104 is asserted, the MUXPDU processor 102 starts to process a frame by calling a second finite state machine (to be described in more detail in connection with FIG. 8). After processing the first frame, a first frame information word is written. According to the control register block 156, the MUXPDU processor 102 may enter an idle state after asserting the interrupt signal, or may wait for a second start of frame signal SOF and processes a second frame. After processing the second frame, the second frame information word is written.

The number of frames that are sent by the decoder 104 during communication with the processor 102 may be an odd number. When processing two frames between interrupts, only one frame is normally processed at the end. In the initialization phase, the coprocessor 106 may program the timer block 158. After processing the first frame, the timer 158 is enabled. If the timer 158 reaches zero before receiving the start of frame signal SOF from the decoder 104, the control unit 122 writes an information word that indicates that there is only one frame in the memory 160, and presents an interrupt to the coprocessor 106 to indicate that there is only one frame in the memory 160.

Figure 7:
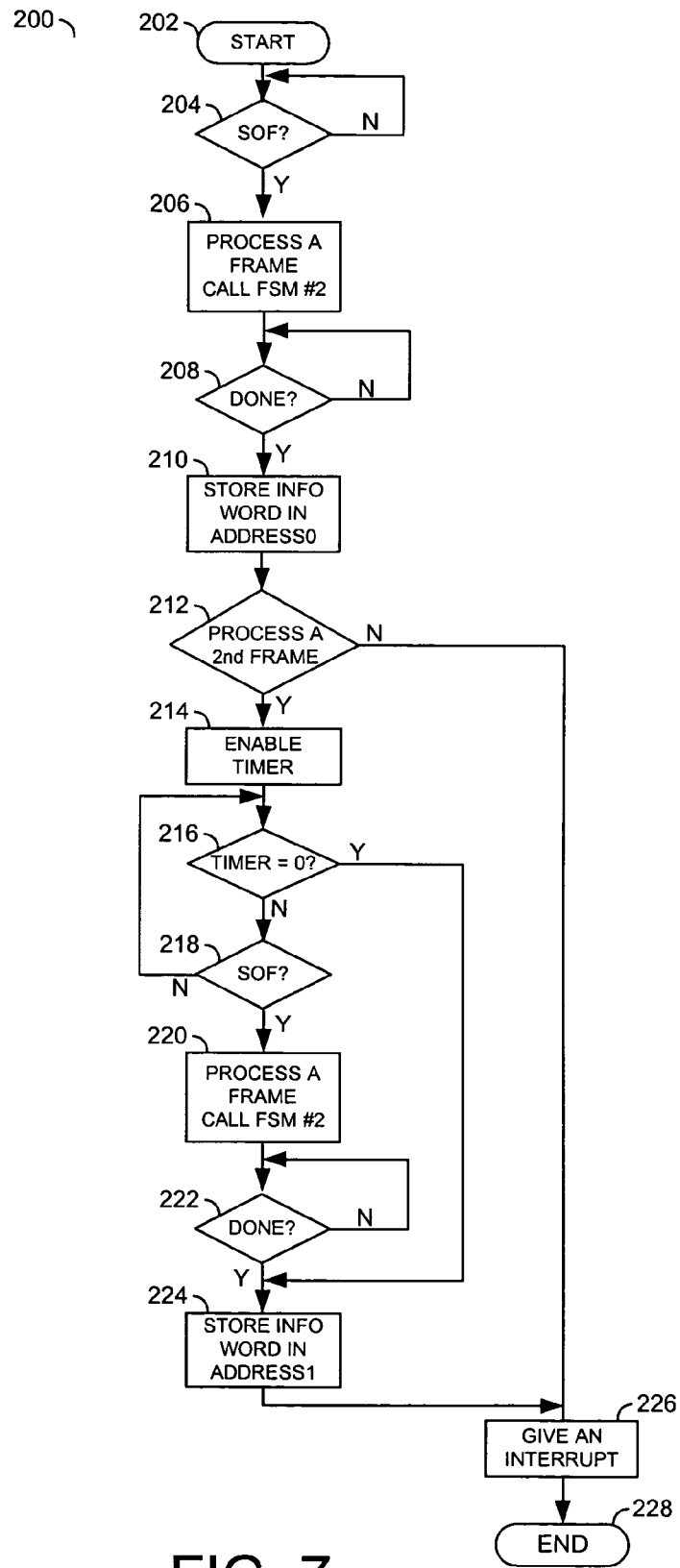
FIG. 7 is a flow diagram of a first finite state machine.

Referring to FIG. 7, a flowchart of the first finite state machine 200 is shown. The finite state machine 200 may be used to process up to two frames. The finite state machine 200 may be implemented as a method or a process 200. The method 200 generally comprises a first state 202, a decision state 204, a state 206, a decision state 208, a state 210, a decision state 212, a state 214, a decision state 216, a decision state 218, a state 220, a decision state 222, a state 224, a state 226 and a state 228. The state 202 may be implemented as a start state. The decision state 204 may determine if a start of frame is present. If a start of frame is present, the method 200 moves to the state 206. If not, the method 200 continues to check for a start of frame. Next, the state 206 processes a frame by calling a second finite state machine (to be described in detail in connection with FIG. 8). Next, the decision state 208 determines with the processing from the state 206 has been completed. If so, the method 200 moves to the state 210 where the information is stored in an address ADDRESS0. If the processing is not complete, the state 208 continues to determine whether the processing has completed.

Next, the decision state 212 determines if a second frame should be processed. If so, the method 200 moves to the state 214. If not, the method 200 moves to the state 226. Next, the state 214 enables a timer. Next, the state 216 determines if the timer has a value equal to zero. If so, the method 200 moves to the state 224. If not, the method moves to the decision state 218. The decision state 218 determines if a start of frame is present. If not, the method 200 moves back to the state 216. If a start of frame is present, the method 200 moves to the state 220. The state 220 processes a frame by calling a second state machine (to be described in detail in connection with FIG. 8). The decision state 222 determines if the processing has completed. If not, the decision state 222 continues to check on the status of the processing. If the processing has completed, the method 200 moves to the state 224. The state 224 stores information in an address ADDRESS1. Next, the method 200 moves to the state 226 where an interrupt is presented. Finally, the method 200 concludes with the end state 228.

Figure 8:
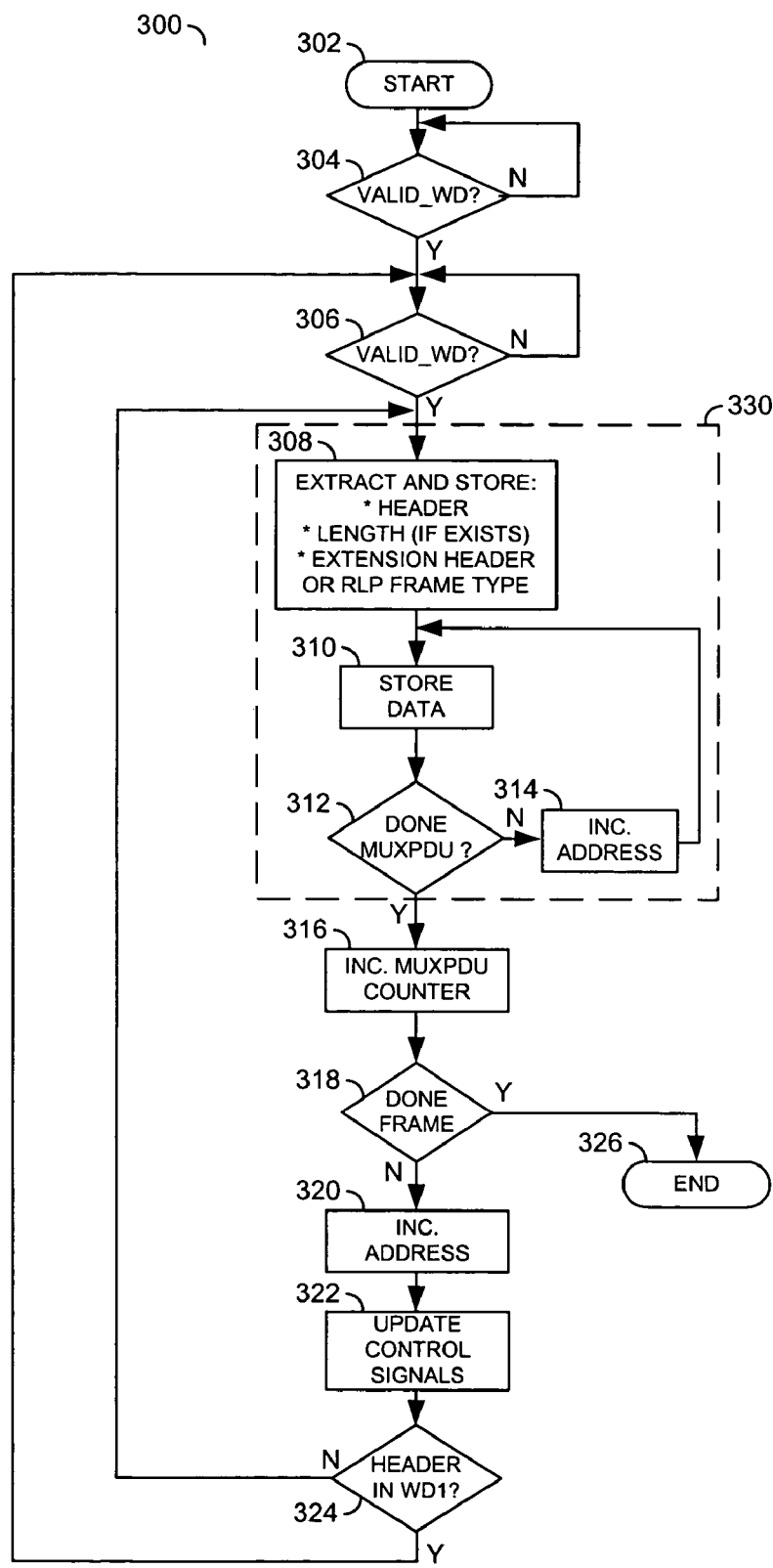
FIG. 8 is a flow diagram of a second finite state machine.

Referring to FIG. 8, a diagram of a method (or process) 300 illustrating a second finite state machine is shown. The finite state machine 300 may be used to process one frame. The method 300 generally comprises a state 302, a decision state 304, a decision state 306, a state 308, a state 310, a decision state 312, a state 314, a state 316, a decision state 318, a state 320, a state 322, a decision state 324, and a state 326. The state 308, the state 310, the state 312 and the state 314 together may be considered a third finite state machine 330. The state machine 330 may be used to process MUXPDU data. The state 302 generally begins the process 300. The decision state 304 checks for a valid word. If a valid word is not present, the decision state 304 continues to check for a valid word. If a valid word is present, the method 300 moves to the state 306. Since the data unit 120 stores two consecutive words, the state 306 also determines if a valid word is present. If not, the method 300 continues to check for a valid word by looping the state 306. If a valid word is present, the method 300 moves to the state 308. The state 308 performs an extract and store computation. The state 308 extracts and stores a header, the length of a packet and/or the extension header or RLP frame type. Next, the state 310 stores data. Next, the state 312 determines if the MUXPDU data processing has completed. If not, the method 300 moves to the state 314, which increments an address and moves to the state 310. If the processing is done, the method 300 moves to the state 316. The state 316 increments the MUXPDU counter. Next the state 318 determines if the processing of the frame has completed. If so, the method 300 moves to the state 326 where the process ends. If not, the method 300 moves to the state 320 which increments the address counter. Next, the method 300 moves to the state 322 which updates the control signals. Next, the decision state 324 determines if the header is in the register WD1. If so, the method 300 moves to the state 306. If not, the method moves to the state 308 and repeats the MUXPDU processing.

The main control unit 152 may include a state machine to process one frame (e.g., the second state machine of FIG. 8). The main control unit 152 may call a state machine to process one MUXPDU with the state machine 300. The processing of the frame starts after receiving two words from the decoder 104. Each MUXPDU in the frame is processed until the end of the frame signal EOF is asserted. At the end of each MUXPDU, the MUXPDU counter 154 is incremented and the main control unit 152 updates the control signal CTR. If the next header of the next MUXPDU is already in the second 16-bit register 132, the MUXPDU data is processed immediately. Otherwise, the MUXPDU processor 102 waits for a new word from the decoder 104.

The main control unit 152 may include a state machine configured to process one MUXPDU. The state machine stores the header, the length (if one exists) and the Extension Header or RLP frame Type field (if one exists) in different addresses according to the structure shown in FIG. 3. According to the header, the state machine supplies control signals to the multiplexer MUX2 in order to extract bits from the 16-bit word. The state machine also supplies the enable signals to the 32-bit register in order to store some bits in one or more parts of the register.

The function performed by the flow diagrams, of FIGS. 7 and 8 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting-an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMS, Flash memory, magnetic or optical cards, or any type of media suitable for storing electronic instructions.

The various signals of the present invention are generally "on" (e.g., a digital HIGH, or 1) or "off" (e.g., a digital LOW, or 0); However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

The present invention may be used in portions of a code division multiple access (CDMA) chipset. While the present invention may be useful in CDMA designs, the present invention may be applied to other designs as well.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a data unit configured to (i) receive an input signal and a data valid signal, said input signal comprising a series of frames, each said frame having a header and a payload comprising a series of words, said data valid signal configured to indicate that said input signal is ready, and (ii) generate an output signal in response to a first word and a second word from said input signal, wherein said output signal comprises a third word comprising a number of bits selected from one or both of the first and the second words in response to a first control signal, and wherein the number of bits and position of the bits in the third word are (i) configured to be varied according to a current format of said frames and (ii) arranged in one of a plurality of formats based upon a second control signal;
   a memory configured to (a) store said output signal in response to one or more memory control signals and (b) provide an interface between said data unit and a device; and
   a control unit configured to generate (i) said first control signal, (ii) said second control signal, (iii) a third control signal presented to said data unit and (iv) said one or more memory control signals to control said memory all in response to both a start of frame signal and said data valid signal.

2. The apparatus according to claim 1, wherein said memory is configured to store, for each of said frames, data from said header in a first address location.

3. The apparatus according to claim 2, wherein said memory is configured to store, for each of said frames, data from said payload in one or more second address locations.

4. The apparatus according to claim 1, wherein said apparatus comprises a multiplex sublayer data unit processor.

5. The apparatus according to claim 1, wherein said device comprises a co-processor.

6. The apparatus according to claim 1, wherein said data unit comprises:
   a first register configured to store said first word of said input signal;
   a second register configured to store said second word of said input signal;
   a first multiplexer configured to receive bits of said first word at a first input and a number of predetermined bits from said first and said second words at a second input, wherein said first multiplexer is configured to present either (i) the bits at said first input or (ii) the bits at said second input at a first output in response to said first control signal;

a formater configured to generate a plurality of signals presenting the bits received from the first output of said first multiplexer in said plurality of formats, wherein said first and said second words have a first size and each of said plurality of signals has a second size larger than said first size;

a second multiplexer configured to select one of said plurality of signals for presentation at a second output in response to said second control signal; and a third register configured to store the signal from the second output of the second multiplexer in response to said third control signal.

7. The apparatus according to claim 1, wherein said frames comprise multiplex sublayer data units.

8. The apparatus according to claim 7, wherein each of said multiplex sublayer data units contains one or more header fields and a data portion.

9. The apparatus according to claim 1, wherein said data unit, said memory and said control unit are each implemented only in hardware.

10. The apparatus according to claim 1, further comprising a timer configured to track whether a predetermined amount of time for the control unit to wait for a second frame to arrive has passed.

11. A method for processing data comprising the steps of:

(A) receiving an input signal and a data valid signal at a data unit circuit, said input signal comprising a series of frames, each said frame having a header and a payload comprising a series of words, said data valid signal being configured to indicate that said input signal is ready, and generating an output signal in response to a first word and a second word from the input signal, wherein said output signal comprises a third word comprising a number of bits selected from one or both of said first and said second words in response to a first control signal, and wherein the number of bits and position of the bits in said third word are (i) configured to be varied according to a current format of said frames and (ii) arranged in one of a plurality of formats based upon a second control signal;

(B) storing said output signal in a memory in response to one or more memory control signals, wherein said memory provides an interface between said data unit circuit and a device; and (C) generating (i) said first control signal, (ii) said second control signal, (iii) a third control signal provided to said data unit circuit and (iv) said one or more memory control signals all in response to both a start of frame signal and said data valid signal.

12. The apparatus according to claim 1, wherein said input signal is received from either a turbo decoder or a viterbi decoder.

13. The apparatus according to claim 1, wherein said control unit further comprises:

a first state machine configured to control how many frames of said input signal are processed;

a second state machine configured to control processing of a single frame; and a third state machine configured to control processing of a data unit of said single frame.

14. The apparatus according to claim 1, wherein said control unit further comprises:

a counter configured to generate a series of addresses; and a multiplexer configured to select between a first predefined address, a second predefined address and an output of said counter for presentation to an address input of said memory.

15. The apparatus according to claim 1, wherein said memory comprises a first bank and a second bank, and wherein (i) said first bank is written to by said data unit while said second bank is read from by said device and (ii) said second bank is written to by said data unit while said first bank is read from by said device.

16. The apparatus according to claim 15, wherein said control unit is further configured to control bank switching of said memory.

17. The apparatus according to claim 1, wherein said control unit is further configured to control said data unit and said memory to store within said memory, a data structure comprising (i) a first address containing information about a first of said frames, (ii) a second address containing information about a second of said frames and (iii) a number of groups of addresses, wherein each said group of addresses contains information from a single data unit of said first frame or said second frame.

18. The apparatus according to claim 17, wherein said first address in said data structure comprises (i) a number of data units stored in the memory for the first frame and (ii) CRC information for the first frame.

19. The apparatus according to claim 17, wherein said second address in said data structure comprises (i) a number of data units stored in the memory for both frames, (ii) CRC information of the second frame and (iii) a number of frames processed.

20. The apparatus according to claim 17, wherein each group of addresses in said data structure comprises (i) a first address containing header information, (ii) a second address containing information about a length of data stored in said data structure, (iii) a third address containing an extension header or protocol frame type, (iv) one or more addresses containing a portion of the data and (v) a last address containing a last portion of the data, wherein said last portion of the data has a width less than or equal to a width of the memory.

21. The apparatus according to claim 1, wherein a third length of said third word is not greater than a sum of a first length of said first word and a second length of said second word.

* * * * *